United States Patent [19]

Newlin et al.

[11] Patent Number: 5,761,293
[45] Date of Patent: Jun. 2, 1998

[54] ISDN COMMUNICATION SYSTEM AND METHOD THEREOF

[75] Inventors: Douglas J. Newlin, Winfield; Robert D. Battin, Palatine; Robert W. Lancelot, Barrington, all of Ill.

[73] Assignee: Motorola, Inc., Schaumburg, Ill.

[21] Appl. No.: 672,819

[22] Filed: Jun. 28, 1996

[51] Int. Cl.[6] .............. H04M 7/00; H04M 3/42; H04J 3/12; H04J 3/24

[52] U.S. Cl. .............. 379/230; 370/466; 370/467; 370/524; 379/201; 379/219; 379/399

[58] Field of Search ................ 370/264, 359, 370/466, 467, 524; 379/201, 207, 219, 220, 229, 230, 225, 233, 234, 399

[56] References Cited

U.S. PATENT DOCUMENTS

| 5,062,108 | 10/1991 | Bales et al. | 370/467 |
| 5,550,913 | 8/1996 | McMaster et al. | 379/230 |

*Primary Examiner*—Harry S. Hong
*Attorney, Agent, or Firm*—Jordan C. Powell; Charles D. Gavrilovich, Jr.

[57] ABSTRACT

A network interface (105) uses valid identifiers including the DN, SPID and Switch ID to communicate with a PSTN (110) and uses generic identifiers to communicate with customer premise equipment (120) in order to establish an ISDN communication link when the customer premise equipment does not know the DN, SPID, and Switch ID.

9 Claims, 3 Drawing Sheets

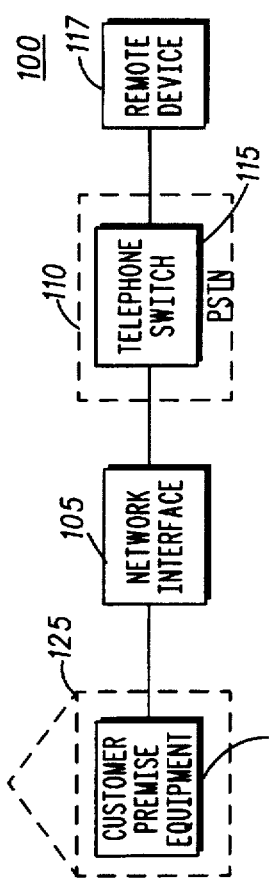
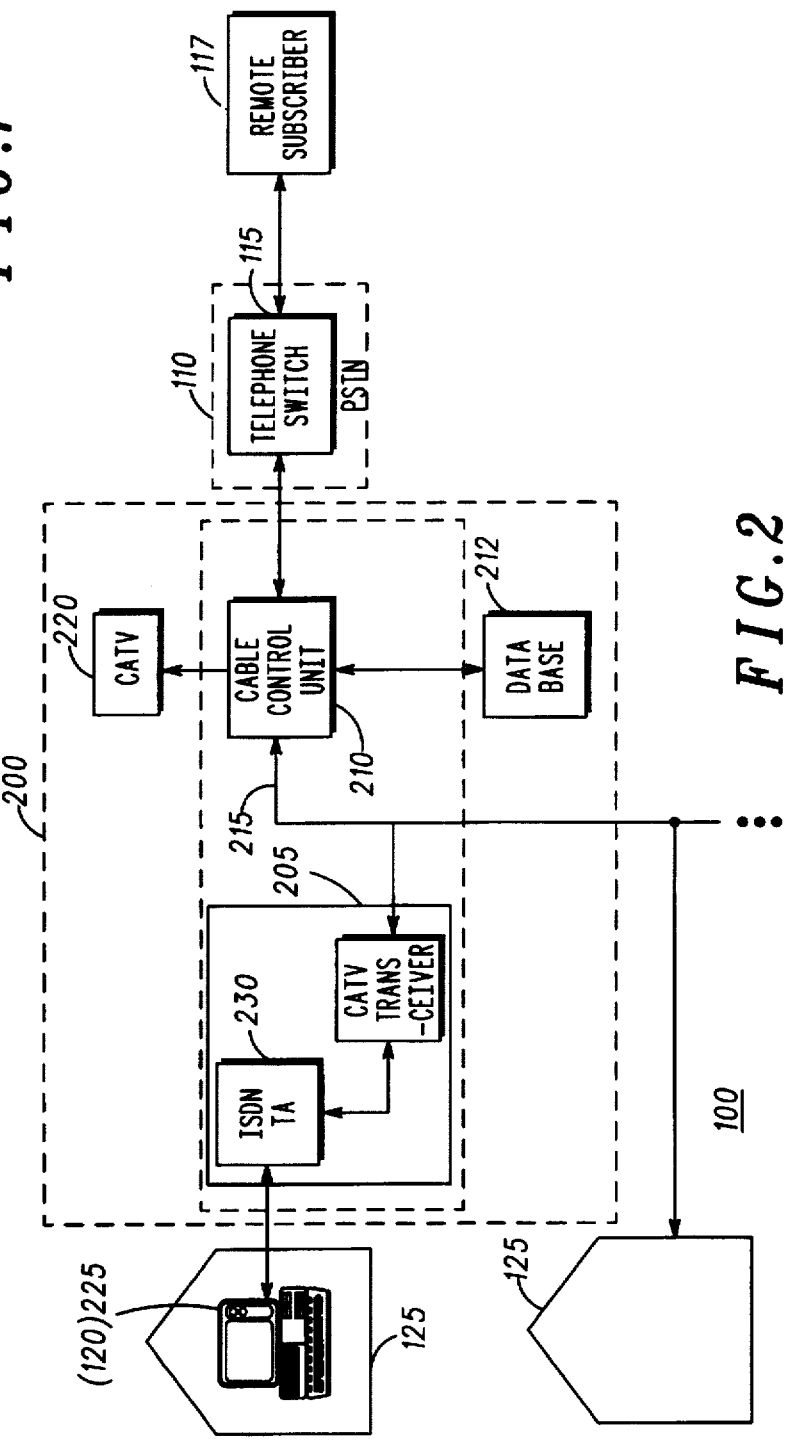

ISDN COMMUNICATION SYSTEM AND METHOD THEREOF

BACKGROUND OF THE INVENTION

The present invention relates, in general, to communication systems, and more particularly to Integrated Services Digital Network (ISDN) telephony communication systems.

As is well known, an ISDN is a network in which connections are made by using digital switches. With this type of system, speech, data and other signals are transmitted as digital signals, using techniques such as time division multiplexing. After the appropriate wiring is connected to the customer premise for ISDN service, the user must configure any customer premise equipment to communicate with the ISDN telephony network. In current systems, the customer premise equipment must have information relating to the directory number (DN), service profile identifier (SPID) and the type of telephony switch utilized by the telephony network in order to communicate with the ISDN. The DN is a unique number identifying the customer premise and is typically the customer premise "phone number". The SPID is a unique number typically generated from the DN and network that is used by the ISDN to assign an endpoint identifier (EID). The method of generating the SPID varies due to the type of system, geographic area and the type of telephone switch used to establish an ISDN communication link. Telephone switches use different protocols and operate in different ways depending on the manufacturer and the class of switch. Therefore, conventional communication systems require the customer premise equipment to have information on the type of telephone switch and to use the appropriate protocols when communicating over the telephony network.

A user must typically enter information concerning the DN, SPID and switch type into the customer premise equipment. Typically, the user manually enters the information through a computer keyboard or a keypad connected to the customer premise equipment. The DN, SPID, and switch type are not readily available to the user. Although users typically know their own phone number, they may be using a different ISDN line to place the call and not be able to readily ascertain the DN being used. For example, the user may not know the phone number of a telephone line being used if the user is making a call from an unfamiliar remote location such as a conference room in a hotel. In conventional ISDN systems, the customer equipment can not access the ISDN without the information. As a result, conventional ISDN systems are difficult to use. A solution to this problem requires the standardization of ISDN protocols and SPIDS. However, because of the several different manufacturers of ISDN customer premise equipment and telephony equipment this solution will likely take several years to implement. In addition, some existing ISDN customer premise equipment may not operate on the standardized format.

Therefore, there exists a need for an ISDN network which does not require the user to enter information into the customer premise equipment in order to access the ISDN telephony network.

BRIEF DESCRIPTION OF THE DRAWINGS

FIG. 1 is schematic drawing of an ISDN communication system according to the present invention.

FIG. 2 is a block diagram of the ISDN communication system of FIG. 1 showing components of one of the elements according to a preferred embodiment of the present invention.

DETAILED DESCRIPTION OF THE DRAWINGS

Figure 3:
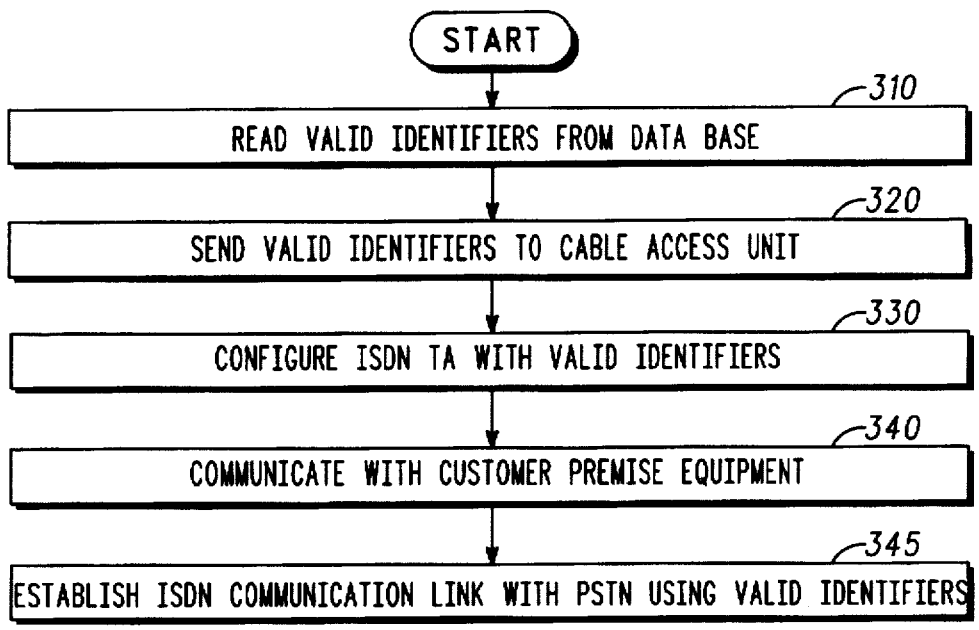
FIG. 3 is a flow chart of a preferred method of establishing an ISDN communication link in accordance with the present invention.

The present invention provides a method and apparatus for ISDN communication. By utilizing the method and apparatus taught by the present invention, a user may access an ISDN telephony network without knowledge of the service profile identifier (SPID), directory number (DN), or type of telephony switch.

A block diagram of a communication system 100 for ISDN communication is shown in FIG. 1. As will be explained in detail below, a network interface 105 communicates with telephony network such as a Public Switched Telephony Network (PSTN) 110 through a telephony switch 115 to establish a communication link with a remote subscriber 117. The network interface 105 communicates with the PSTN 110 using valid identifiers including the SPID, DN and a telephone switch identifier (Switch ID) in order to establish an ISDN communication link with the remote subscriber 117. The Switch ID represents the type of telephony switch 115 in the system 100 and therefore, the Switch ID indicates the appropriate protocols to use when communicating with the telephony switch 115. Valid identifiers are identifiers that are recognized by the PSTN 110 and will allow communication over the PSTN 110. The network interface 105 communicates with customer premise equipment 120 without using identifiers. The network interface 105 may use generic identifiers representing the SPID, DN and Switch ID if the customer premise equipment requires identifiers to communicate. Generic identifiers are identifiers which conform to a format recognized by the customer premise equipment 120, located in the customer premise 125, but are not necessarily recognized by the PSTN 110. Since the network interface 105 uses valid identifiers to communicate with the PSTN 110, the customer premise equipment 120 does not need to have information on the DN, SPID, or Switch ID to use the ISDN communication link. The network interface 105 uses valid protocols when communicating with the telephony switch 115. Therefore, the customer premise equipment communicates over the ISDN link without knowing how to generate the SPID from the DN or what protocol is required by the telephony switch 115.

A block diagram of an ISDN communication system 100 according to the preferred embodiment of the present invention is shown in FIG. 2. A cable telephony communication system 200 connected is used to establish a communication link between the subscriber premise 125 and the PSTN 110. The network interface unit 105 comprises a first device such as a cable access unit 205 and second device such as a cable control unit 210. The cable access unit 205 and the cable control unit 210 are connected by a cable network 215. The cable access unit 205 and the cable control unit 210 transmit and receive a variety of different signals including Plain Old Telephone Service (POTS) telephony, ISDN, video telephony and video programming signals over the cable network 215. The cable network 215 consists of several splitters, combiners, amplifiers and cables which are preferably Hybrid/Fiber Coax (HFC). However, the cable network 215 may utilize any cable of suitable material consistent with the operation of the particular cable telephony communication system 200. The cable access unit 205 is typically attached to the exterior of the customer premise 125 similar to a telephone box. The cable control unit 210 typically services several cable access units (205) and is connected to the telephony switch 115 which is part of the PSTN 110. The cable access units (205) may be connected to the PSTN though a cable, fiber optic, wireless or other type of communication link depending on the particular cable telephony communication system 200. The PSTN 110 provides various telephony services including ISDN services. Cable television services are provided to the customer premise 125 by combining CATV 220 signal with the other telephony services using known techniques in the cable control unit 210. Depending on the particular communication system 200, other services may be combined using known techniques. Signals are transmitted and received over the cable 215 using techniques known in the cable telephony industry.

In the preferred embodiment of the invention, the cable control unit 210 retrieves the valid identifiers from a data base 212 by reading stored values from memory. The data base 212 contains required information to access the ISDN including the DN of each cable access unit 205, the SPID for each cable access unit 205 and the Switch ID for the telephony switch 115. Preferably, the valid identifiers are manually entered into the data base 212 at the time the cable control unit 210 is installed and connected to the telephony switch 115. However, the valid identifiers may be entered by other methods or may be modified after installation of the cable control unit 210 if necessary.

The cable control unit 210 sends the valid identifiers to the cable access unit 205 over the cable network 215 using known techniques. The valid identifiers are received by the cable access unit 205 and used to configure an ISDN terminal adapter (ISDN TA) 230 located in the cable access unit 205.

Customer premise equipment (120) such as a computer 225 is directly connected to the ISDN TA 230 of the cable access unit 205 preferably through an RS232 connector. Although any type of connector may be used, the type of connector will typically be dictated by the customer premise equipment 120 (225). The ISDN TA 230 communicates with the computer 225 using known techniques. The ISDN TA 230 then adapts transmitted and received data to be compatible with the computer 225 and the PSTN 110 as typically performed by conventional terminal adapters in the industry. For example, a terminal adapter (230) will convert an "R" interface, which is a non-ISDN standard interface typically used with computers (225) and other customer premise equipment (120), to a "T" interface which is a standard ISDN interface. The cable access unit 205 then modifies the output of the ISDN TA 230 for transmission over the cable 215 to the cable control unit 210 according to the particular protocol of the cable telephony communication system 200. The cable access unit 205 also modifies the incoming data signals (signals from the PSTN 110) directed to the computer 225 that are sent using cable telephony protocols into the proper format before the data is received by the ISDN TA 230.

Therefore, the ISDN TA 230 is configured by the network interface and not by the user. Valid identifiers are read from memory by the cable control unit 210, sent to the cable access unit 205 and used to configure the ISDN TA 230, which is internal to the cable access unit 205.

A flow chart of the operation of the network interface 105 in accordance with the preferred method of the present invention is shown in FIG. 3. The procedure which is typically performed during the customer premise equipment 120 initialization procedure begins at step 310. The cable control unit 210 reads valid identifiers from the data base 212 at step 310. The valid identifiers include a DN, SPID, and Switch ID. At step 320, the cable control unit 210 sends the valid identifiers over the cable 215 to the cable access unit 205. The cable access unit 205 uses the valid identifiers to configure the internal ISDN TA 230 at step 330. At step 340, the cable access unit 205 communicates with the customer premise equipment 120, such as a computer 225, using a standard computer interface such as RS232. The cable access unit 205 establishes the ISDN communication link through the PSTN 110 using the valid identifiers at step 345.

Figure 4:
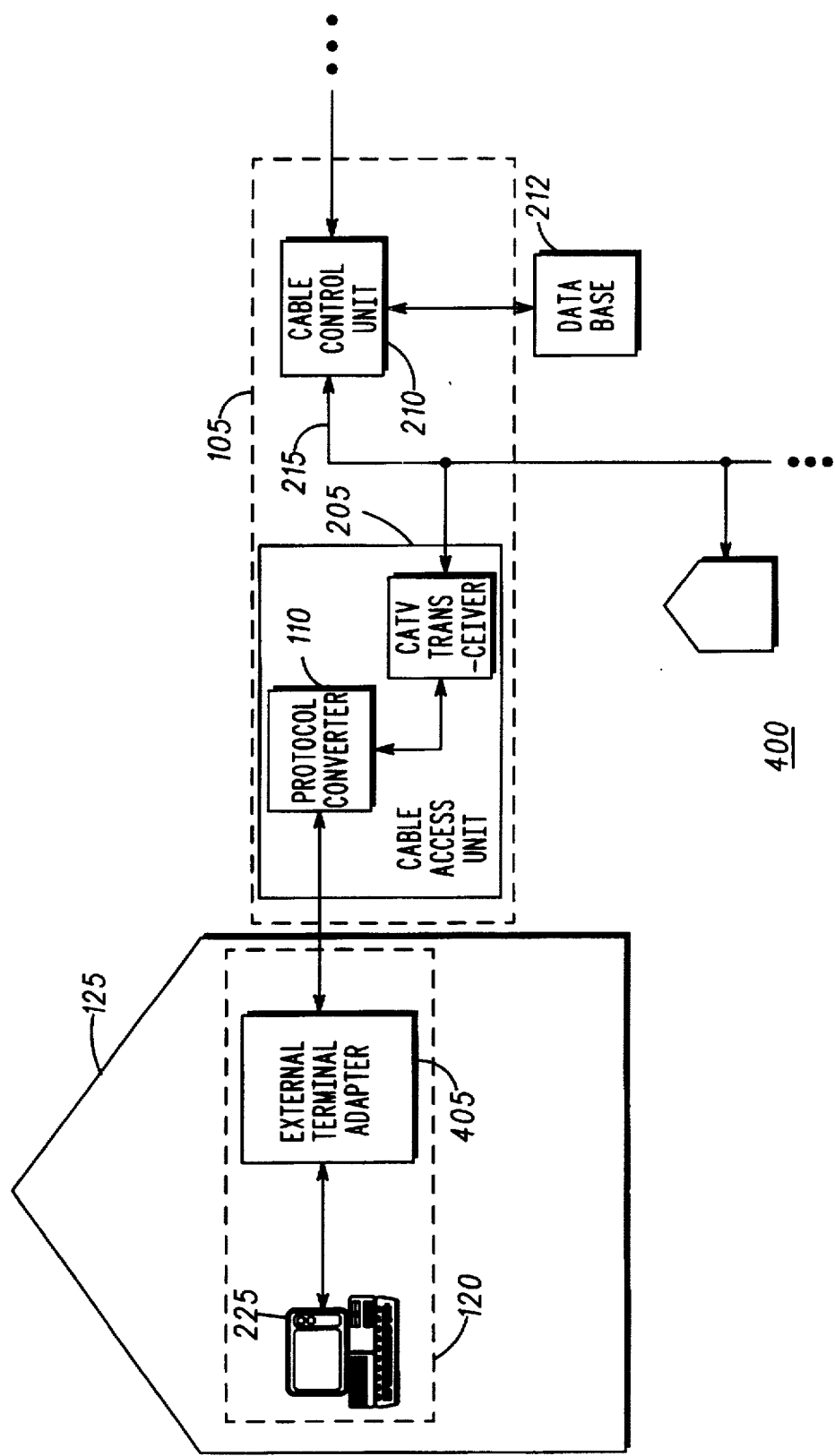
FIG. 4 is a block diagram of the ISDN communication system of FIG. 1 according to an alternate embodiment of the present invention.

A block diagram of a communication system 400 according to an alternate embodiment of the present invention is shown in FIG. 4. The customer premise equipment 120 comprises a computer 225 and an external terminal adapter 405 connected to the computer 225. The external terminal adapter 405 is any of the several commercially available terminal adapters such as the BitSURFR™ and BitSURFR PRO™ terminal adapters manufactured by Motorola. These terminals adapters typically are connected to an ISDN telephone line and are configured by the user by entering the SPID, DN and type of telephony switch 115. In the alternate embodiment, the external terminal adapter 405 is connected to a protocol converter 410 in the cable access unit 205 of the network interface 105. Since terminal adapters (405) typically require the user to configure the terminal adapter (405) by entering identifiers, the user enters generic identifiers representing the DN, SPID, and Switch ID into the external terminal adapter 405 through the computer 225. Generic identifiers are identifiers that are in the proper form to be recognized by the external terminal adapter 405 but do not necessarily contain any true information. For example, if the external terminal adapter 405 prompts the user to enter the DN, which is a 10 digit number, the user simply enters any ten digit number, possibly "0123456789". The cable access unit 205 appears as a telephony switch to the external terminal adapter and accepts the generic identifiers. The cable access unit 205 uses the generic identifiers to generate an endpoint identifier that is used to communicate with the external terminal adapter 405 in the same manner that a telephony switch would communicate if it had received valid identifiers.

The cable access unit 205 uses the same protocol used by the external terminal adapter 405. For example, if the user communicates to the external terminal adapter 405 that the telephony switch is a 5ESS™ switch, then the external terminal adapter 405 communicates with the cable access unit 205 using 5ESS™ switch custom Q.931 protocols. The cable access unit 205 recognizes the protocol and communicates with the external terminal adapter 405 using the 5ESS™ switch custom Q.931 protocols.

Valid identifiers are retrieved from the data base 212 and transmitted by the cable control unit 210 to the cable access unit 205 in same manner as in the preferred embodiment described above. The DN and SPID are used to communicate with the PSTN 110 as in the preferred embodiment.

The protocol converter 410 compares the protocol dictated by the valid identifier, particularly the valid Switch ID, to the protocol being used by the external terminal adapter 405. If the user has correctly identified the telephony switch 115 to the external terminal adapter 405 by entering a generic identifier that indicates the appropriate protocol to use with the telephony switch 115, then the protocol converter 410 does not modify the protocols and simply allows the signals to pass through.

If, however, the user has not entered the correct Switch ID, the protocol converter 410 converts the signals received from the external terminal adapter 405 to the protocol used by the telephony switch 115. Also, the protocol converter 410 converts the signals transmitted to the terminal adapter from the telephony switch 115 to the same protocol the external terminal adapter is using. For example, if the generic Switch ID dictates the use of Q.931 signaling and the telephony switch 115 is DMS 100 switch, the protocol converter 410 converts signals transmitted from the PSTN 110 from DMS 100 custom Q.931 protocols to 5ESS™ switch custom Q.931 protocols and the signals coming from the external terminal adapter 405 from 5ESS™ switch custom Q.931 protocols to DMS 100 custom Q.931 protocols.

Figure 5:
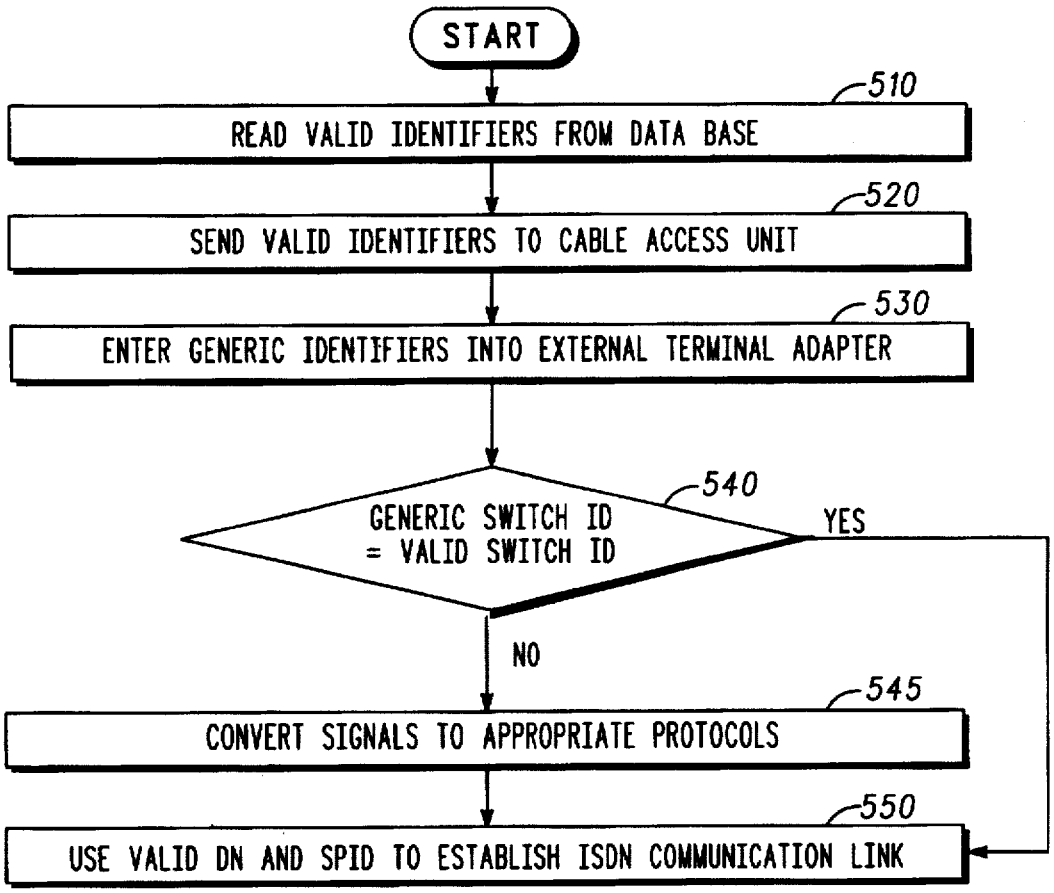
FIG. 5 is a flow chart of an alternate method for establishing an ISDN communication link in accordance with the present invention.

A flow chart in accordance with the alternate method of the present invention is shown in FIG. 5. The procedure which typically performed when the customer premise equipment performs an initialization procedure, begins at step 510. The cable control unit 210 reads valid identifiers from the data base 212 at step 510. The valid identifiers include a DN, SPID, and Switch ID. At step 520, the cable control unit 210 sends the valid identifiers over the cable 215 to the cable access unit 205. The user enters generic identifiers into the external terminal adapter 405 through the computer 225 at step 530. At step 540, the cable access unit 205 determines if the generic Switch ID is the same as the valid Switch ID. In other words, the cable access unit 205 determines if the external terminal adapter 405 is using a protocol which is compatible with the protocol that the telephony switch 115 is using. If the protocols are the same, the method proceeds to step 550. If the protocols are different, the method goes to step 545 where the protocol converter 410 in the cable access unit 205 converts the signals. Signals transmitted from the PSTN 110 are converted to signals which use the protocol used by the external terminal adapter 405. The signals sent from the external terminal adapter 405 are converted to signals which use the protocol used by the telephony switch 115. At step 550, the cable access unit 205 sends the valid identifiers for the SPID and the DN to the PSTN 110. The telephony switch 115 recognizes the valid identifiers and allows access to the ISDN.

Therefore the present invention allows a user to easily access an ISDN communication system 100. The user does not need to have knowledge of the telephony switch 115, PSTN 110 or identifiers such as the DN or SPID in order to configure customer premise equipment 120. In addition, if the user changes location or if the system is changed the user is not effected because the network interface 105 adjusts for the differences.

We claim:

1. A network interface comprising:

a cable control unit for communicating with telephony network through a first Integrated Services Digital Network (ISDN) communication link;

a cable access unit coupled to the cable control unit;

a data base for storing a valid identifier coupled to the cable access unit; and the cable access unit establishing a second ISDN communication link between the customer premise equipment and a telephony network by reading the valid identifier from the data base and using the valid identifier to communicate with the telephony network.

2. A network interface according to claim 1 wherein the cable access unit communicates with customer premise equipment using a generic identifier.

3. A network interface according to claim 1 wherein the data base is coupled to the cable access unit through the cable control unit.

4. A network interface according to claim 1 wherein the cable access unit sends an endpoint identifier to the customer premise equipment.

5. A network interface according to claim 4 wherein the cable access unit generates the endpoint identifier.

6. A network interface according to claim 4 wherein the cable control unit sends the endpoint identifier to the cable access unit.

7. A network interface according to claim 1 wherein the cable access unit communicates with the telephony network using a service profile identifier.

8. A network interface according to claim 1 wherein the cable access unit communicates with the telephony network using a directory number.

9. A network interface according to claim 1 wherein the cable access unit communicates with the telephony network using a switch identifier.

* * * * *